(12) United States Patent
Fujita

(10) Patent No.: US 8,300,164 B2
(45) Date of Patent: Oct. 30, 2012

(54) LIQUID CRYSTAL DEVICE

(75) Inventor: Shin Fujita, Suwa (JP)

(73) Assignee: Sony Corporation, Tokyo (JP)

( * ) Notice: Subject to any disclaimer, the term of this patent is extended or adjusted under 35 U.S.C. 154(b) by 1109 days.

(21) Appl. No.: 12/000,175

(22) Filed: Dec. 10, 2007

(65) Prior Publication Data

US 2008/0204616 A1 Aug. 28, 2008

(30) Foreign Application Priority Data

Feb. 23, 2007 (JP) ................................ 2007-043371

(51) Int. Cl.
*G02F 1/1343* (2006.01)

(52) U.S. Cl. ............ 349/39; 349/43; 349/139; 349/140; 349/144

(58) Field of Classification Search ............... 349/38–39, 349/43, 47, 139, 140, 142, 143, 144
See application file for complete search history.

(56) References Cited

U.S. PATENT DOCUMENTS 6,771,343 B2  8/2004 Kim et al.
6,842,213 B2  1/2005 Kim et al.
2002/0113929 A1* 8/2002 Yamazaki et al. ............ 349/123
2005/0052384 A1  3/2005 Fujita
2005/0270433 A1* 12/2005 Ohue et al. ...................... 349/38
2006/0158574 A1* 7/2006 Kubo et al. ...................... 349/38
2007/0153142 A1* 7/2007 Nam et al. ...................... 349/38

FOREIGN PATENT DOCUMENTS

| JP | A 07-311383 | 11/1995 |
| JP | A 2003-075812 | 3/2003 |
| JP | A 2003-228073 | 8/2003 |
| JP | A-2005-003916 | 1/2005 |
| JP | A 2006-154080 | 6/2006 |
| KR | 2002-0078148 A | 10/2002 |

* cited by examiner

*Primary Examiner* — Uyen Chau N Le
*Assistant Examiner* — Michael Mooney
(74) *Attorney, Agent, or Firm* — K&L Gates LLP

(57) ABSTRACT

A liquid crystal device have an element substrate including a scanning line, a data line and a pixel electrode, a cutout is formed on the pixel electrode. A capacitor line for providing a storage capacitor is formed on the element substrate. The capacitor line has a first and second portions. The first portion extends along with the scanning line, and a second line portion overlaps the cutout of the pixel electrode.

9 Claims, 6 Drawing Sheets

--PRIOR ART--

--PRIOR ART--

LIQUID CRYSTAL DEVICE

BACKGROUND

1. Technical Field

The present invention relates to a liquid crystal device having a plurality of pixels that each have a pixel switching element, a pixel electrode, and a storage capacitor. More particularly, the invention relates to a structure of a capacitor line for providing a storage capacitor.

2. Related Art

A typical technique for improving viewing angle characteristics of a liquid crystal device may be used to produce a vertical alignment (VA) mode liquid crystal device. A VA mode liquid crystal device uses a nematic liquid crystal material having a negative anisotropy of dielectric constant as a liquid crystal material and a vertical alignment film. For such a liquid crystal device, dividing a pixel electrode into a plurality of sub-pixel electrodes connected with a connecting portion therebetween in order to control an alignment of a liquid crystal has been proposed (See JP-A-2003-228073).

In such a VA mode liquid crystal device, when a storage capacitor is formed in parallel with a liquid crystal capacitor, a capacitor line 3b is formed in parallel with a scanning line 3a on an element substrate 10 as shown in FIGS. 6A and 6B. A storage capacitor 60 is formed by this capacitor line 3b, an extending portion 1x that extends from the drain region of a thin-film transistor 30 that constitutes a pixel switching element, and an insulating film formed simultaneously with a gate insulating layer 2. In order to realize a capacitance greater than or equal to a certain value for the storage capacitor 60, the capacitor line 3b must have a large width. As a result, an aperture ratio per pixel (a ratio of a region through which display light can be transmitted in a pixel region) decreases. In particular, a pixel electrode 7a is often divided into a plurality of sub-pixel electrodes 7b and 7c connected with a connecting portion 7e therebetween in such a VA mode liquid crystal device. In such a case, cutouts 7f provided between the sub-pixel electrodes 7b and 7c are domain regions in which an alignment of a liquid crystal cannot be controlled. Therefore, in such a VA mode liquid crystal device, providing a sufficient capacitance to the storage capacitor 60 leads to a disadvantage that the quality of a display image may be easily degraded; for example, sufficient amount of display light may not be able to be maintained.

Such a disadvantage exists not only for the VA mode liquid crystal device but also for, for example, an IPS (in-plane switching) mode liquid crystal device, in which a liquid crystal is driven by a horizontal electric field. That is, in such an IPS mode liquid crystal device, a pixel electrode or a common electrode is often formed in a bent pectinate shape in order to reduce changes in color caused by an angle of visibility. In such a case, a domain region that does not contribute to display is generated at a bent portion. Thus, in the IPS mode liquid crystal device, forming a storage capacitor having a sufficient capacitance also leads to a disadvantage that the quality of a display image may be easily degraded; for example, a sufficient amount of display light may not be able to be maintained.

SUMMARY

An advantage of some aspects of the invention is to provide a liquid crystal device capable of displaying a high-quality image even when a storage capacitor is formed with a capacitor line of a desired width.

In addition, another advantage of some aspects of the invention is to provide a liquid crystal device capable of reducing a resistance of the capacitor line when the capacitor line is formed with the capacitor line of a desired width.

According to a first aspect of the invention, a liquid crystal device includes a liquid crystal that is held between an element substrate and a counter substrate opposite the element substrate, a plurality of pixel electrodes, each of the pixel electrodes being formed at a corresponding one of intersections of scanning lines and data lines in the element substrate, a common electrode that is formed in the element substrate or formed in the counter substrate so as to be opposite the pixel electrodes, and a plurality of capacitor lines that are each formed so as to provide a plurality of storage capacitors in the element substrate, each of the storage capacitors being formed at a corresponding one of the intersections of the scanning lines and data lines in the element substrate. Each of the capacitor lines includes a first capacitor line portion that extends in parallel with a corresponding one of the scanning lines at a position close to the scanning line and a second capacitor line portion that is formed so as to overlap a region in a corresponding one of the pixel electrodes where a cutout is formed.

According to the first aspect of the invention, in the case of providing such a storage capacitor constituted by the capacitor line, the capacitor line includes the first capacitor line portion, and the second capacitor line portion. The first capacitor line portion is at the position close to the scanning line and extends in parallel with the scanning line. The second capacitor line portion is formed so as to overlap the cutouts provided between the sub-pixel electrodes. The storage capacitor includes the first storage capacitor and the second storage capacitor. Therefore, even when the first capacitor line portion is not formed so as to have a large width, a storage capacitor having a sufficient capacitance can be formed. Since the second capacitor line portion is formed so as to overlap a domain region which does not contribute to display, an amount of emitted display light does not decrease even when the second capacitor line portion is added, and thereby a high quality image can be displayed.

According to a second aspect of the invention, a liquid crystal device includes a liquid crystal that is held between an element substrate and a counter substrate opposite the element substrate, a plurality of pixel electrodes, each of the pixel electrodes being formed at a corresponding one of intersections of scanning lines and data lines in the element substrate, a common electrode that is formed in the counter substrate so as to be opposite the pixel electrodes, and a plurality of capacitor lines that are each formed so as to provide a plurality of storage capacitors in the element substrate, each of the storage capacitors being formed at a corresponding one of the intersections of the scanning lines and data lines in the element substrate. The liquid crystal has a negative anisotropy of dielectric constant. Each of the pixel electrodes is divided into a plurality of sub-pixel electrodes connected with a connecting portion therebetween. Each of the capacitor lines includes a first capacitor line portion that extends in parallel with a corresponding one of the scanning lines at a position close to the scanning line and a second capacitor line portion that is formed so as to overlap a region provided between corresponding sub-pixel electrodes.

According to the second aspect of the invention, in a VA mode liquid crystal device in the case of providing such a storage capacitor constituted by the capacitor line, the capacitor line includes the first capacitor line portion, and the second capacitor line portion. The first capacitor line portion is at the position close to the scanning line and extends in parallel with the scanning line. The second capacitor line portion is formed so as to overlap the region provided between the sub-pixel electrodes. The storage capacitor includes the first storage capacitor and the second storage capacitor. Therefore, even though the first capacitor line portion is not formed so as to have a large width, a storage capacitor having a sufficient capacitance can be formed. Since the second capacitor line portion is formed so as to overlap the region provided between the sub-pixel electrodes which does not contribute to display, an amount of emitted display light does not decrease even when the second capacitor line portion is added, and thereby a high quality image can be displayed.

According to a third aspect of the invention, a liquid crystal device includes a liquid crystal that is held between an element substrate and a counter substrate opposite the element substrate, a plurality of pixel electrodes, each of the pixel electrodes being formed at a corresponding one of intersections of scanning lines and data lines in the element substrate, a common electrode that is formed in the element substrate, and a plurality of capacitor lines that are each formed so as to provide a plurality of storage capacitors in the element substrate, each of the storage capacitors being formed at a corresponding one of the intersections of the scanning lines and data lines in the element substrate. The pixel electrodes and the common electrode are each formed in the element substrate as a pectinate-shaped electrode including bent portions that are formed so as to be in parallel with each other. Each of the capacitor lines includes a first capacitor line portion that extends in parallel with a corresponding one of the scanning lines at a position close to the scanning line and a second capacitor line portion that is formed so as to overlap corresponding bent portions.

According to the third aspect of the invention, in an IPS mode liquid crystal device in the case of providing such a storage capacitor constituted by the capacitor line, the capacitor line includes the first capacitor line portion which extends in parallel with the corresponding one of the scanning lines at the position close to the scanning line and the second capacitor line portion that is formed so as to overlap the bent portions of the pectinate-shaped electrodes. The storage capacitor can be formed, constituted by the first and the second capacitor line portions. Therefore, a storage capacitor having a sufficient capacitance can be formed even though the first capacitor line portion is not formed so as to have a large width. In addition, the second capacitor line portion is formed so as to overlap the bent portions of the pectinate-shaped electrodes. Such an overlapping region does not contribute to display. Therefore, since an amount of emitted display light does not decrease even when the second capacitor line portion is added, and thereby a high quality image can be displayed.

According to the first aspect of the invention, each of the first capacitor line portion and the second capacitor line portion may be formed as a wiring that passes between a plurality of pixels that extend along the capacitor line. Such a structure causes the capacitor line to have a lower wiring resistance than a structure in which the second capacitor line portion merely branches from the first capacitor line portion.

According to the first aspect of the invention, it is preferable that each of the capacitor lines may further include a third capacitor line portion which extends so as to overlap a corresponding one of the data lines and connects the first capacitor line portion and the second capacitor line portion. Such a structure does not decrease an aperture ratio per pixel even when the third capacitor line portion is added since the third capacitor line portion extends so as to overlap the corresponding one of the data lines. In addition, if a third storage capacitor is also formed at the third capacitor line portion, the storage capacitor having a sufficient capacity can be formed even in the case where the first and the second capacitor line portions are formed to have a small width.

According to the first aspect of the invention, the liquid crystal device may further include pixel switching elements that are each formed between a corresponding one of the data lines and a corresponding one of the pixel electrodes and becomes an ON state in a case where a corresponding one of the scanning lines is selected. The pixel switching elements are each composed of a thin-film transistor. A semiconductor layer used in the thin-film transistor extends to regions which overlap corresponding first and second capacitor line portions and a corresponding one of the storage capacitors is formed between the semiconductor layer and the first and second capacitor line portions at the regions.

According to the first aspect of the invention, if the pixel switching element is a thin-film transistor, the semiconductor layer used in the thin-film transistor may extend to the regions which overlap the first and second capacitor line portions and employ such a structure where the storage capacitor includes a first storage capacitor formed between the semiconductor layer and the first capacitor line portion and a second storage capacitor formed between the semiconductor layer and the second capacitor line portion.

A liquid crystal device according to the invention can be used as a display or the like of electronic apparatuses such as a mobile phone or a mobile computer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 6A:
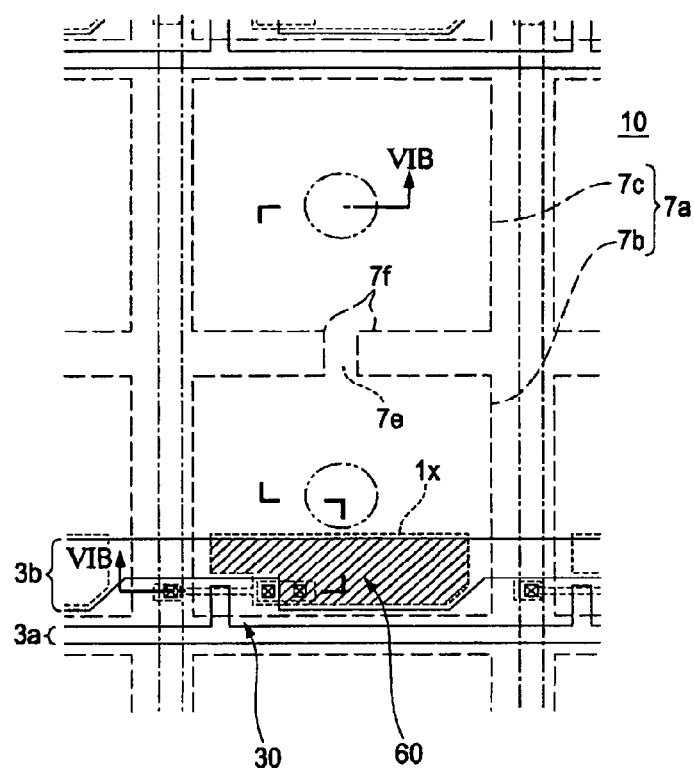
FIG. 6A is a plan view of adjacent pixels on an element substrate of a VA mode liquid crystal device of the related art.
Figure 6B:
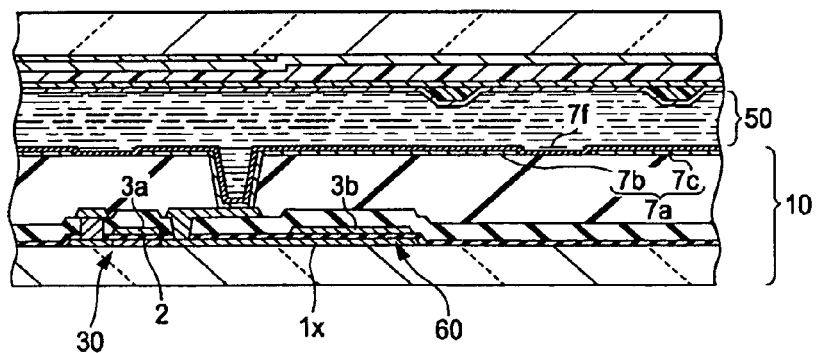
FIG. 6B is a sectional view of a pixel taken along line VIB-VIB of FIG. 6A.

Embodiments of the invention will be described below. In the figures to which the following description refers, layers and parts are shown in different scales so as to allow easy recognition of the layers and parts. In addition, units having a common function are given the same reference numeral and described so as to show their relation to a structure with reference to FIGS. 6A and 6B.

FIRST EMBODIMENT

Overall Structure

Figure 1A:
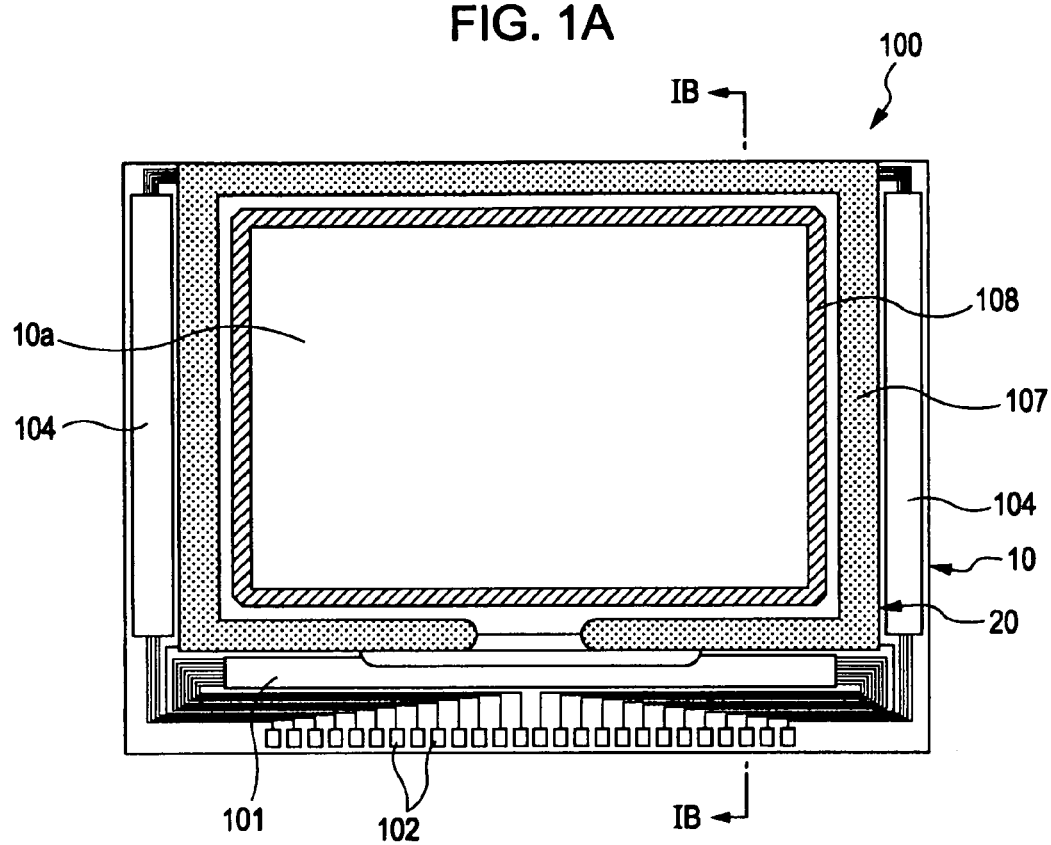
FIG. 1A is a plan view of a liquid crystal device to which the invention is applied and components formed on the liquid crystal device, the plan view being viewed from a counter substrate.
Figure 1B:
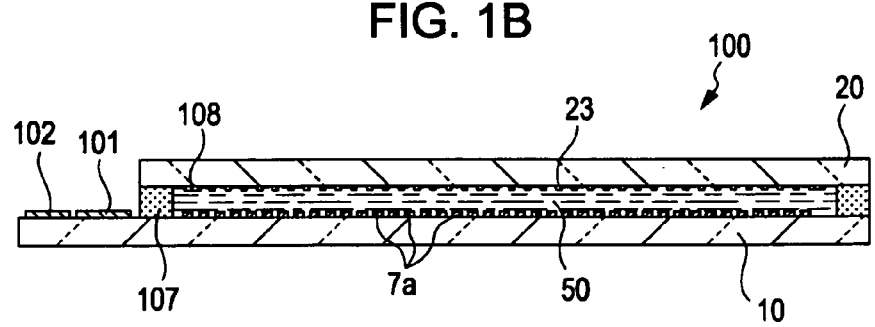
FIG. 1B is a sectional view taken along line IB-IB of FIG. 1A.

FIG. 1A is a plan view of a liquid crystal device according to a first embodiment of the invention and components formed on the liquid crystal device, as viewed from a counter substrate, and FIG. 1B is a sectional view taken along line IB-IB of FIG. 1A. Note that an alignment film, a common electrode, and the like are not shown in FIG. 1B.

Referring to FIGS. 1A and 1B, a liquid crystal device 100 of the first embodiment is a transmissive active-matrix liquid crystal device. A sealing member 107 is provided along edges of a counter substrate 20 on an element substrate 10. A data-line driving circuit 101 and a plurality of mounting terminals 102 are provided along a side of the element substrate 10 in an area positioned more outward than the sealing member 107 on the element substrate 10. A scanning-line driving circuit 104 is formed along each of two sides of the element substrate 10, the two sides being adjacent to the side along which the mounting terminals 102 are provided. Furthermore, a peripheral circuit such as a precharge circuit, an inspection circuit, or the like may be provided below a frame region 108. The counter substrate 20 is substantially defined by the outer edges of the sealing member 107, and is attached to the element substrate 10 with the sealing member 107 therebetween. A liquid crystal 50 is held between the element substrate 10 and the counter substrate 20.

As will be described later in detail, a plurality of pixel electrodes 7a are formed in a matrix on the element substrate 10. The frame region 108 composed of a light-blocking material is formed in an area positioned more inward than the sealing member 107 on the counter substrate 20, and an area defined by the frame region 108 is an image display area 10a. On the counter substrate 20, a light-blocking film 23, which may also be referred to as a black matrix or black stripes, is provided opposite the boundary region extending longitudinally and laterally between the pixel electrodes 7a arranged on the element substrate 10.

As will be described later in detail, the liquid crystal 50 is driven in a VA mode or an IPS mode in the first embodiment and a second embodiment described later. In the case of VA mode driving, the pixel electrodes 7a are formed on the element substrate 10, and a common electrode (not shown) is formed on the counter substrate 20. In contrast, both the pixel electrodes 7a and the common electrode are formed on the element substrate 10 for IPS mode driving.

Specific Structure of Liquid Crystal Device 100

Figure 2:
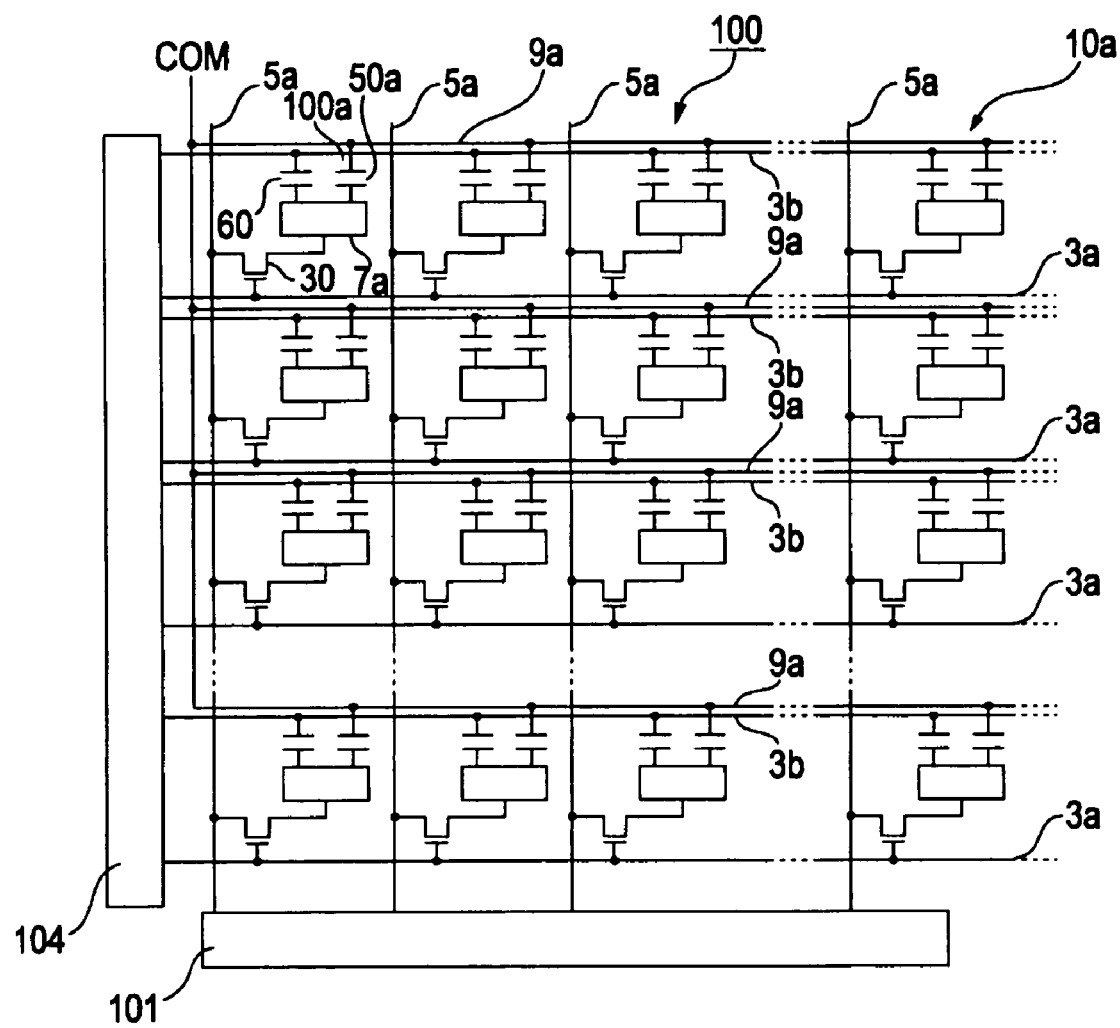
FIG. 2 is an equivalent circuit diagram showing an electrical structure of the liquid crystal device to which the invention is applied.

An electrical structure of the liquid crystal device 100 according to this embodiment will be described with reference to FIG. 2. FIG. 2 is an equivalent circuit diagram showing the electrical structure of the liquid crystal device 100.

As shown in FIG. 2, in the image display area 10a of the liquid crystal device 100, a plurality of data lines 5a for supplying data signals (image signals) and a plurality of scanning lines 3a for supplying scanning signals are arranged so as to intersect one another, and a plurality of pixels 100a are formed at the corresponding intersections of the data lines 5a and the scanning lines 3a. To each of the pixels 100a, a thin-film transistor 30 serving as a pixel switching element and a corresponding one of the pixel electrodes 7a are provided. At each of the pixels 100a, a corresponding one of the data lines 5a, a corresponding one of the scanning lines 3a, and a corresponding one of the pixel electrodes 7a are electrically connected to the source, gate, and drain of a corresponding thin-film transistor 30, respectively. In the liquid crystal device 100 with such a structure, by controlling such a thin-film transistor 30 to be in an ON state for a predetermined period, a data signal supplied from the corresponding data line 5a is written into a liquid crystal capacitor 50a via the corresponding pixel electrode 7a, and the written pixel signal is held between the pixel electrode 7a and a common electrode 9a for a predetermined period.

Capacitor lines 3b are formed in parallel with the corresponding scanning lines 3a, and a storage capacitor 60 is formed between each of pairs of the capacitor lines 3b and the corresponding pixel electrodes 7a (between the capacitor line 3b and the drain of the corresponding thin-film transistor 30) in the liquid crystal device 100 of the first embodiment. Thus, the storage capacitor 60 allows a voltage of the pixel electrode 7a to be maintained, for example, for a time period increased by as much as three orders of magnitude in comparison with the time period during which the source voltage has been applied. This improves storing characteristics of electric charge, and results in the liquid crystal device 100 being capable of achieving a high contrast ratio. Although the capacitor line 3b seems like a wiring extending from the scanning-line driving circuit 104 in FIG. 2, the capacitor line 3b is maintained at a predetermined electric potential. In addition, the common electrode 9a is also maintained at a predetermined electric potential (COM).

Basic Structure of Pixel

Figure 3A:
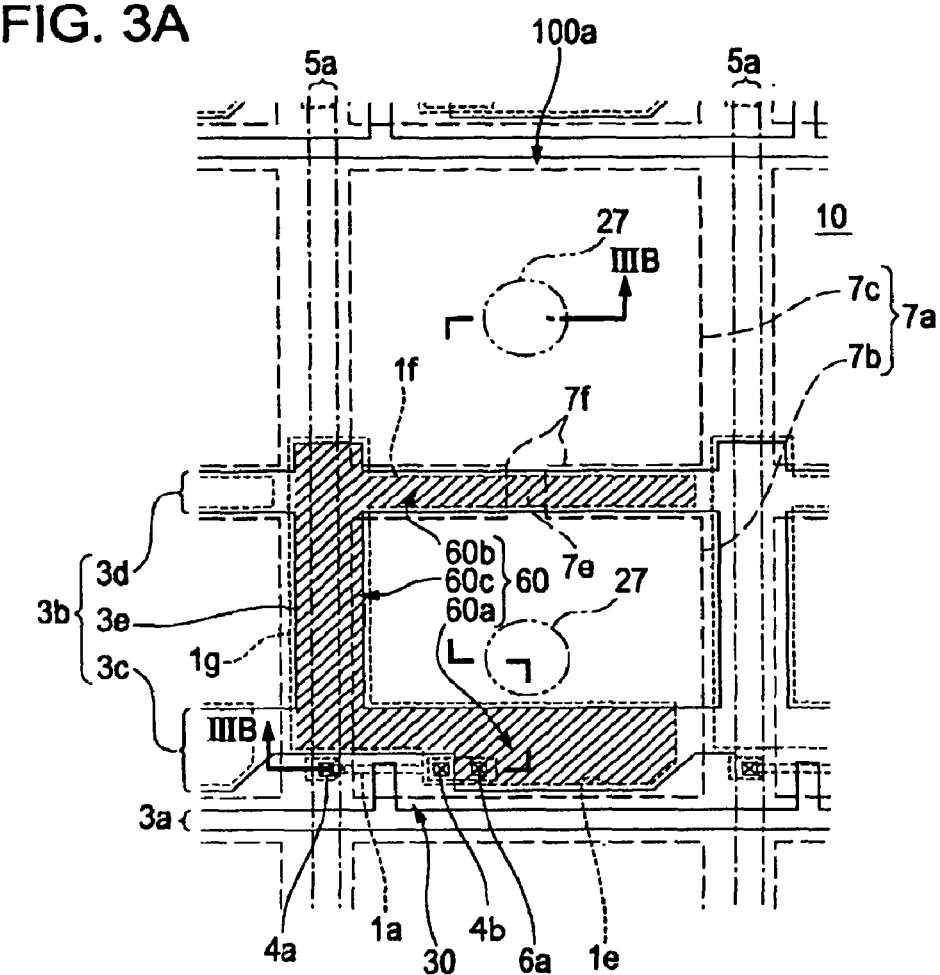
FIG. 3A is a plan view of adjacent pixels on an element substrate of a VA mode liquid crystal device according to a first embodiment of the invention.
Figure 3B:
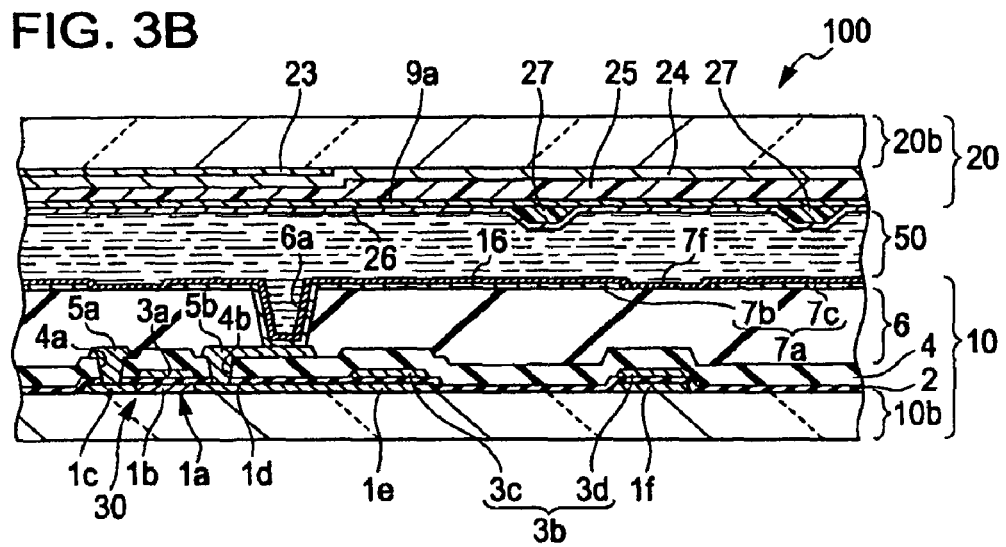
FIG. 3B is a sectional view of a pixel taken along line IIIB-IIIB of FIG. 3A.

FIG. 3A is a plan view of a pixel in the element substrate 10 used in the liquid crystal device 100 according to the first embodiment of the invention, and FIG. 3B is a sectional view of the pixel taken along line IIIB-IIIB of FIG. 3A. Note that, in FIG. 3A, the pixel electrode 7a is indicated by a long-dash line, the data line and the drain electrode formed simultaneously with the data line are indicated by alternate-long-and-short-dash lines, the scanning line 3a and the capacitor line 3b formed simultaneously with the scanning line 3a are indicated by solid lines, and a semiconductor layer used in an active layer of the thin-film transistor 30 is indicated by a short-dash line. Moreover, since the storage capacitor 60 is formed at an overlapping region of the capacitor line 3b and the semiconductor layer of the thin-film transistor 30, the region where the storage capacitor 60 is formed is shaded with rightwardly upward diagonal lines in FIG. 3A. Furthermore, in FIG. 3A, an alignment-control protrusion formed on the counter substrate 20 is indicated by an alternate-long-and-two-short-dash line.

As shown in FIGS. 3A and 3B, the pixel electrode 7a that is transparent and composed of indium tin oxide (ITO) is formed at the corresponding pixel 100a in the element substrate 10, and the data lines 5a and the scanning lines 3a are formed along the longitudinal and lateral parts of the boundary region surrounding the pixel electrode 7a, respectively. A base substrate of the element substrate 10 is a transparent substrate 10b such as a quartz substrate, a glass substrate, or the like. A base substrate of the counter substrate 20 is a transparent substrate 20b such as a quartz substrate, a glass substrate, or the like. In the first embodiment, both the transparent substrates 10b and 20b are glass substrates.

In the element substrate 10, an base protective film (not shown) composed of a silicon oxide film or the like is formed on a surface of the transparent substrate 10b, and such a thin-film transistor 30 having a top-gate structure is formed at a position close to each pixel electrode 7a on the surface of the base protective film. A channel formation region 1b, a source region 1c, and a drain region 1d are formed in an island-shaped semiconductor layer 1a constituting an active layer in the thin-film transistor 30. The source region 1c and the drain region 1d are heavily doped impurity regions in the first embodiment; however, the thin-film transistor 30 may be formed to have a lightly doped drain (LDD) structure by providing lightly doped impurity regions on either side of the channel formation region 1b. The semiconductor layer 1a is a polysilicon film polycrystallized by laser annealing or lamp annealing after an amorphous silicon film is formed in the element substrate 10.

A gate insulating layer 2 composed of a silicon oxide film, a silicon nitride film, or a stacked film including these films is formed above the semiconductor layer 1a, and a part of the scanning line 3a overlaps the gate insulating layer 2 as the gate electrode.

An interlayer insulating film 4 composed of a silicon oxide film, a silicon nitride film, or a stacked film including these films is formed above the gate electrode (the scanning line 3a). The data line 5a is formed on a surface of the interlayer insulating film 4, and this data line 5a is electrically connected to the source region 1c via a contact hole 4a formed in the interlayer insulating film 4. Moreover, the drain electrode 5b is formed on the surface of the interlayer insulating film 4, and the drain electrode 5b is a conductive film formed simultaneously with the data line 5a. The drain electrode 5b is electrically connected to the drain region 1d via a contact hole 4b formed in the interlayer insulating film 4 and the gate insulating layer 2.

An interlayer insulating film 6 is formed above the data line 5a and the drain electrode 5b. The interlayer insulating film 6 is formed as a planarizing film composed of a thick photosensitive resin having a thickness of 1.5 μm to 2.0 μm in the first embodiment. Alternatively, a protective film composed of a silicon nitride film may be formed above the data line 5a and the drain electrode 5b, and the interlayer insulating film 6 composed of a photosensitive resin may be formed above the protective film.

The pixel electrode 7a composed of an ITO film is formed in an island shape on a surface of the interlayer insulating film 6. The pixel electrode 7a is electrically connected to the drain electrode 5b via a contact hole 6a formed in the interlayer insulating film 6. An alignment film 16 composed of a polyimide resin is formed on the surface of the pixel electrode 7a.

In the counter substrate 20, the light-blocking film 23, which may also be referred to as the black matrix or black stripes, is formed opposite the boundary region extending longitudinally and laterally between the pixel electrodes 7a, and a color filter 24 is formed so as to overlap the light-blocking film 23. The light-blocking film 23 and the color filter 24 are covered by a planarizing film 25 composed of a photosensitive resin or the like, and the common electrode 9a composed of ITO or the like is formed over almost the entire surface of the counter substrate 20 on a surface of the planarizing film 25. Moreover, an alignment film 26 composed of a polyimide resin is formed close to the surface of the common electrode 9a.

Specific Structure of Pixel

The first embodiment employs the VA mode in the liquid crystal device 100 with such a structure. Thus, a liquid crystal material having a negative anisotropy of dielectric constant is used as the liquid crystal 50, and a vertical alignment film is used as each of the alignment films 16 and 26. The pixel electrode 7a is divided into sub-pixel electrodes 7b and 7c by cutouts 7f, and the sub-pixel electrodes 7b and 7c are connected via a connecting portion 7e therebetween. Here, although the sub-pixel electrodes 7b and 7c are shown as being square-shaped, the sub-pixel electrodes 7b and 7c may have substantially square shapes having rounded corners or circular shapes. Furthermore, a slit (not shown) may be formed in each of the sub-pixel electrodes 7b and 7c from the peripheral edge to the center.

An alignment-control protrusion 27 is formed adjacent to the common electrode 9a in each of certain regions which overlap the centers of the sub-pixel electrodes 7b and 7c, the certain regions being in the counter substrate 20. Each of the alignment-control protrusions 27 has, for example, an approximate height of 1.0 μm, and forms a gentle slope at a pretilt angle with respect to the alignment film 26. Such an alignment-control protrusion 27 is composed of, for example, a photosensitive resin.

In the liquid crystal device 100 with such a structure, liquid crystal molecules having a negative anisotropy of dielectric constant are aligned vertically relative to a surface of the substrate. Light modulation is performed by applying a voltage and causing liquid crystal molecules to tilt. In the liquid crystal device 100 according to the first embodiment, the alignment-control protrusions 27 for controlling alignments of the liquid crystal molecules are formed at positions corresponding to the centers of the sub-pixel electrodes 7b and 7c, the positions being on the counter substrate 20. Therefore, the liquid crystal molecules, which are vertically aligned, can be tilted within a range of 360° in each of the centers of the sub-pixel electrodes 7b and 7c. Thus, a wide viewing angle can be achieved. Since a force which is effective at aligning the liquid crystal molecules decreases with distance from the alignment-control protrusion 27, the speed of response of the liquid crystal molecules may decrease or light leakage may occur as the distance becomes larger. This may result in degrading of the quality of a display image; however, since each pixel electrode 7a is divided into the sub-pixel electrodes 7b and 7c, the liquid crystal 50 can be driven within a region relatively close to the alignment-control protrusion 27.

Structure of Storage Capacitor

To arrange the storage capacitor 60 in each of the pixels 100a, the capacitor line 3b is formed in parallel with the scanning line 3a above an insulating film formed simultaneously with the gate insulating layer 2 in the first embodiment. Here, the capacitor line 3b includes a first capacitor line portion 3c and a second capacitor line portion 3d. The first capacitor line portion 3c extends in parallel with the scanning line 3a at a position close to the scanning line 3a. The second capacitor line portion 3d is formed so as to overlap two cutouts 7f and the connecting portion 7e provided between the sub-pixel electrodes 7b and 7c. The first and second capacitor line portions 3c and 3d extend so as to pass between a plurality of pixels 100a arranged in a direction along which the corresponding scanning line 3a extends in the first embodiment.

In addition, the capacitor line 3b includes a third capacitor line portion 3e which extends to a region which overlaps the data line 5a and is connected to the first capacitor line portion 3c and the second capacitor line portion 3d. The sub-pixel electrode 7b is surrounded by the first capacitor line portion 3c, the second capacitor line portion 3d, and the third capacitor line portion 3e. Here, the third capacitor line portion 3e extends partially along the corresponding data line 5a and does not extend close to a target scanning line 3a.

A first storage capacitor 60a, a second storage capacitor 60b, and a third storage capacitor 60c of the capacitor line 3b are formed by utilizing the first capacitor line portion 3c, the second capacitor line portion 3d, and the third capacitor line portion 3e, respectively, in the first embodiment. These storage capacitors 60a, 60b, and 60c constitute the storage capacitor 60.

More specifically, the semiconductor layer 1a of the thin-film transistor 30 includes a first extending portion 1e which extends from the drain region 1d to a region which overlaps the first capacitor line portion 3c and is close to the scanning line 3a. The first extending portion 1e and the first capacitor line portion 3c constitute the first storage capacitor 60a in which the insulating film formed simultaneously with the gate insulating layer 2 serves as a dielectric layer. Moreover, the semiconductor layer 1a includes a second extending portion 1f which extends to a region which overlaps the second capacitor line portion 3d. The second extending portion 1f and the second capacitor line portion 3d constitute the second storage capacitor 60b in which the insulating film formed simultaneously with the gate insulating layer 2 serves as a dielectric layer.

Here, the second extending portion 1f is connected to the first extending portion 1e via a third extending portion 1g. The third extending portion 1g overlaps the third capacitor line portion 3e in a region where the third extending portion 1g overlaps the data line 5a, and constitutes the third storage capacitor 60c in which the insulating film formed simultaneously with the gate insulating layer 2 serves as a dielectric layer.

Advantage(s) of First Embodiment

As described above, the capacitor line 3b includes the first capacitor line portion 3c, the second capacitor line portion 3d, and the third capacitor line portion 3e in the liquid crystal device 100 of the first embodiment, the liquid crystal device 100 being driven in the VA mode. The first capacitor line portion 3c is at the position close to the corresponding one of the scanning lines 3a and extends in parallel with the scanning line 3a. The second capacitor line portion 3d is formed so as to overlap the cutouts 7f provided between the sub-pixel electrodes 7b and 7c. The third capacitor line portion 3e connects the first capacitor line portion 3c to the second capacitor line portion 3d. The storage capacitor 60 includes the first storage capacitor 60a, the second storage capacitor 60b, and the third storage capacitor 60c, which are formed by utilizing the capacitor line portions 3c, 3d, and 3e, respectively. Here, the first capacitor line portion 3c is formed at a region from which display light can be emitted, the region being close to the scanning line 3a. The first capacitor line portion 3c is formed so as to have a predetermined width in order to achieve a high aperture ratio per pixel, and the second and the third capacitor line portions 3d and 3e constitute the second and the third storage capacitors 60b and 60c, respectively. Therefore, even in the case where the first capacitor line portion 3c is formed so as to have a relatively small width, the storage capacitor 60 having a sufficient capacitance can be formed.

Here, the second capacitor line portion 3d is formed in a region which overlaps the cutouts 7f provided between the sub-pixel electrodes 7b and 7c. Such a region is a domain region. Since the domain region does not contribute to display, an amount of emitted display light does not decrease even when the second capacitor line portion 3d is added, and thereby a high quality image can be displayed.

The third capacitor line portion 3e is formed in a region which overlaps the data line 5a. Since such a region overlaps the light-blocking film 23 formed in the counter substrate 20, an amount of emitted display light does not decrease even when the third capacitor line portion 3e is added, and thereby a high quality image can be displayed.

Moreover, the first and the second capacitor line portions 3c and 3d extend along the corresponding scanning line 3a so as to pass between a plurality of pixels 100a, and are connected via the third capacitor line portion 3e. Thus, according to the first embodiment, there is an advantage that the capacitor line 3b has a lower wiring resistance than a structure in which the second capacitor line portion 3d merely branches from the first capacitor line portion 3c.

Furthermore, the third capacitor line portion 3e extends partially along the corresponding data line 5a and does not extend close to the target scanning line 3a. Therefore, since an overlapping area of the third capacitor line portion 3e and the data line 5a can be minimized, a parasitic capacitance between the capacitor line 3b and the data line 5a can be reduced. Note that if the parasitic capacitance between the capacitor line 3b and the data line 5a causes substantially no disadvantages, the third capacitor line portion 3e may extend close to the target scanning line 3a and the sub-pixel electrode 7c may be almost surrounded by the first, second, and third capacitor line portions 3c, 3d, and 3e.

Note that the first embodiment shows an example in which the pixel electrode 7a is divided into two; however, the pixel electrode 7a may be divided into three or more.

SECOND EMBODIMENT

Pixel Structure

Figure 4A:
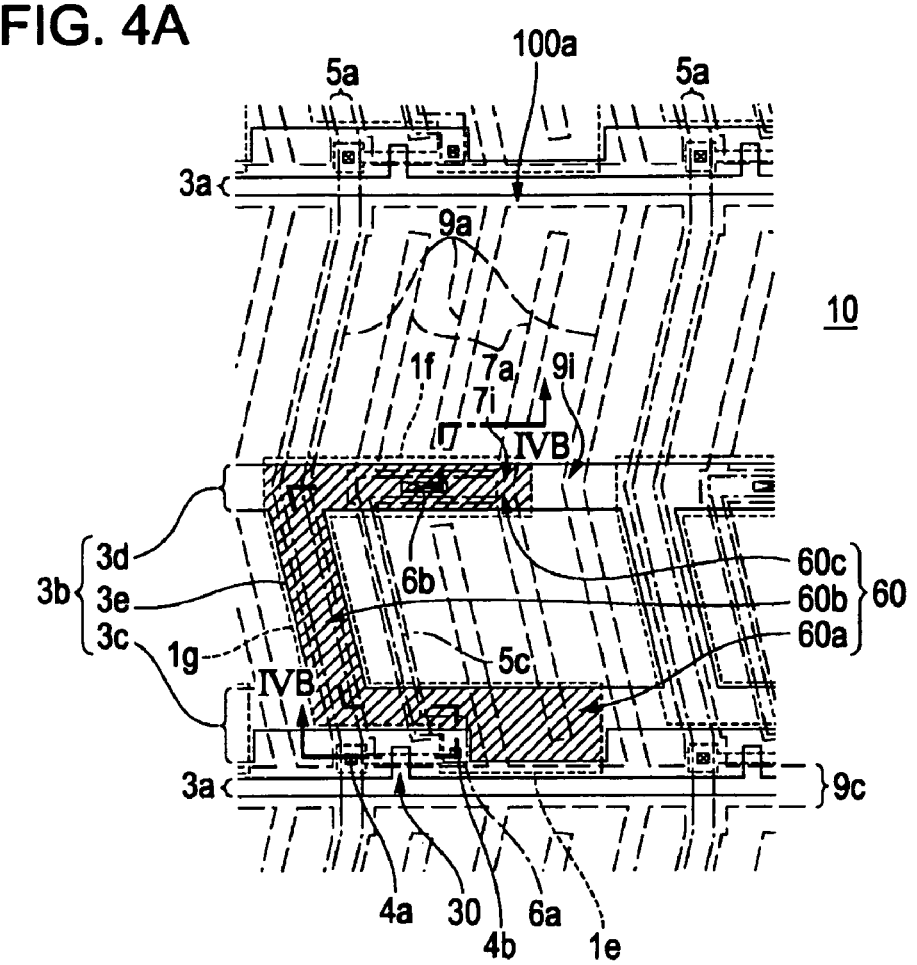
FIG. 4A is a plan view of adjacent pixels on an element substrate of a IPS mode liquid crystal device according to a second embodiment of the invention.
Figure 4B:
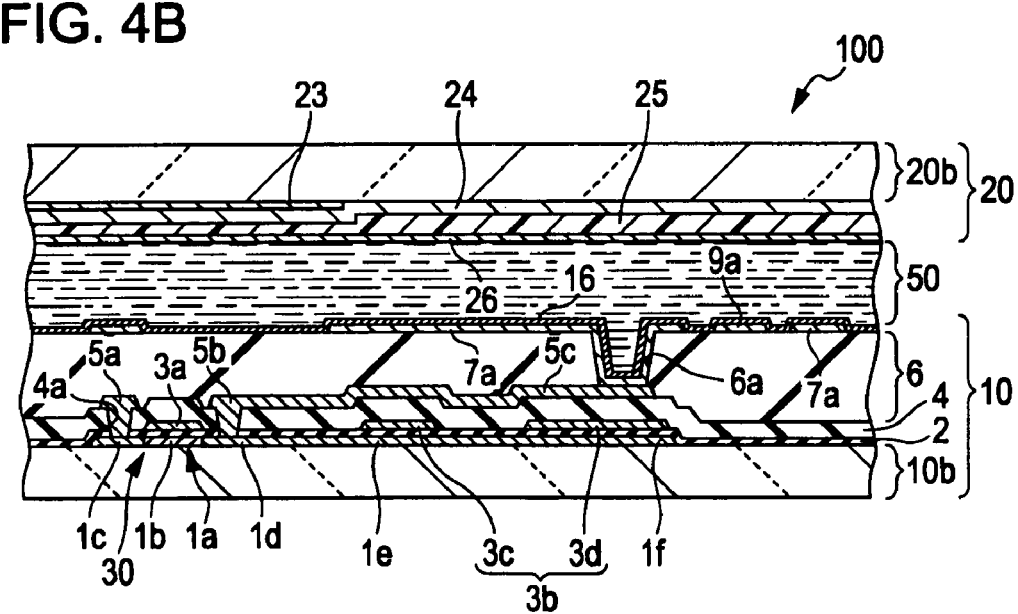
FIG. 4B is a sectional view of a pixel taken along line IVB-IVB of FIG. 4A.

FIG. 4A is a plan view of a pixel arranged on an element substrate which is used for a liquid crystal device according to a second embodiment of the invention, and FIG. 4B is a sectional view of the liquid crystal device taken along line IVB-IVB of FIG. 4A. Note that, in FIG. 4A, the pixel electrode 7a and the common electrode 9a are indicated by long-dash lines, the data line and the drain electrode formed simultaneously with the data line are indicated by alternate-long-and-short-dash lines, the scanning line 3a and the capacitor line 3b formed simultaneously with the scanning line 3a are indicated by solid lines, and a semiconductor layer used in an active layer of the thin-film transistor 30 is indicated by a short-dash line. Moreover, since the storage capacitor 60 is formed at an overlapping region of the capacitor line 3b and the semiconductor layer of the thin-film transistor 30, the region where the storage capacitor 60 is formed is shaded with rightwardly upward diagonal lines in FIG. 4A.

As shown in FIGS. 4A and 4B, in the element substrate 10, such a pixel electrode 7a, which is transparent and composed of an ITO film, is formed at each of the pixels 10a. The data lines 5a and the scanning lines 3a are formed along the boundary region extending longitudinally and laterally between the pixels 100a. Similarly to the first embodiment, both the transparent substrates 10b and 20b are also glass substrates in the second embodiment.

In the element substrate 10, the base protective film (not shown) composed of a silicon oxide film or the like is formed on a surface of the transparent substrate 10b, and such a thin-film transistor 30 having a top-gate structure is formed at a position close to each pixel electrode 7a above the surface of the transparent substrate 10b. The channel formation region 1b, the source region 1c, and the drain region 1d are formed in the island-shaped semiconductor layer 1a constituting an active layer in the thin-film transistor 30. In the second embodiment, the semiconductor layer 1a is a polysilicon film polycrystallized by laser annealing or lamp annealing after an amorphous silicon film is formed in the element substrate 10. The gate insulating layer 2 is formed above the semiconductor layer 1a, and a part of the scanning line 3a overlaps the gate insulating layer 2 as the gate electrode. The interlayer insulating film 4 is formed above the gate electrode (the scanning line 3a). The data line 5a is formed on the surface of the interlayer insulating film 4. The data line 5a is electrically connected to the source region 1c via the contact hole 4a formed in the interlayer insulating film 4. Moreover, the drain electrode 5b is formed on the surface of the interlayer insulating film 4, and the drain electrode 5b is electrically connected to the drain region 1d via the contact hole 4b formed in the interlayer insulating film 4 and the gate insulating layer 2. The interlayer-insulating film 6 is formed above the data line 5a and the drain electrode 5b.

In the second embodiment, the pixel electrode 7a composed of the ITO film is formed in a pectinate shape on the surface of the interlayer insulating film 6. The pixel electrode 7a is electrically connected to an extending portion 5c via the contact hole 6a formed in the interlayer insulating film 6. The alignment film 16 composed of a polyimide resin is formed above the surface of the pixel electrode 7a.

In the counter substrate 20, the light-blocking film 23, which may also be referred to as the black matrix or black stripes, is formed opposite the boundary region extending longitudinally and laterally between the pixel electrodes 7a, and the color filter 24 is formed so as to overlap the light-blocking film 23. The light-blocking film 23 and the color filter 24 are covered by the planarizing film 25 composed of a photosensitive resin or the like, and the alignment film 26 composed of a polyimide resin is formed on the surface of the planarizing film 25.

Since the liquid crystal device 100 employs the IPS mode in the second embodiment, the common electrode 9a is formed not in the counter substrate 20 but in the element substrate 10. That is, a common wiring 9c composed of an ITO film is formed so as to overlap the scanning line 3a and is positioned above the interlayer insulating film 6 in the element substrate 10, and the common electrode 9a, which is in a pectinate shape, extends from the common wiring 9c and laterally becomes oriented with the pixel electrode 7a.

Here, the pixel electrode 7a and the common electrode 9a include bent portions 7i and 9i, respectively, which are bent in the same direction on a virtual straight line in parallel with the scanning line 3a. The pixel 100a is divided into two, upper and lower pixel portions, at the virtual straight line. That is, the pixel electrode 7a and the common electrode 9a extend obliquely with respect to a direction to which the data line 5a extends (a direction perpendicular to a direction to which the scanning line 3a extends). Inclination of the pixel electrode 7a and common electrode 9a is axisymmetric with respect to the virtual straight line passing between the bent portions 7i and 9i. Therefore, in the case where a rubbing treatment is performed to the direction to which the data line 5a extends (the direction perpendicular to the direction to which the scanning line 3a extends), the orientation of the liquid crystal is shifted in axisymmetric directions with respect to the virtual straight line passing between the bent portions 7i and 9i. Thus, the liquid crystal device 100 of the second embodiment has superior characteristics in terms of a viewing angle.

Structure of Storage Capacitor

Similarly to the first embodiment, to arrange the storage capacitor 60 in each of the pixels 100a, the capacitor line 3b is formed in parallel with the scanning line 3a above the insulating film formed simultaneously with the gate insulating layer 2 in the second embodiment. Here, the capacitor line 3b includes the first capacitor line portion 3c which extends in parallel with the scanning line 3a at a position close to the scanning line 3a and the second capacitor line portion 3d which is formed so as to overlap the bent portions 7i of the pixel electrode 7a and the bent portions 9i of the common electrode 9a. The first and second capacitor line portions 3c and 3d extend so as to pass between a plurality of pixels 100a arranged in a direction along which the corresponding scanning line 3a extends in the second embodiment.

In addition, similarly to the first embodiment, the capacitor line 3b includes the third capacitor line portion 3e which extends to a region which overlaps the data line 5a and is connected to the first capacitor line portion 3c and the second capacitor line portion 3d. The sub-pixel electrode 7b is surrounded by the first capacitor line portion 3c, the second capacitor line portion 3d, and the third capacitor line portion 3e. Here, the third capacitor line portion 3e extends partially along the corresponding data line 5a and does not extend close to a target scanning line 3a.

Moreover, the first storage capacitor 60a, the second storage capacitor 60b, and the third storage capacitor 60c are formed by utilizing the first capacitor line portion 3c, the second capacitor line portion 3d, and the third capacitor line portion 3e of the capacitor line 3b, respectively, in the second embodiment. These storage capacitors 60a, 60b, and 60c constitute the storage capacitor 60. More specifically, similarly to the first embodiment, the semiconductor layer 1a of the thin-film transistor 30 includes the first extending portion 1e which extends from the drain region 1d to a region which overlaps the first capacitor line portion 3c. The first extending portion 1e and the first capacitor line portion 3c constitute the first storage capacitor 60a in which the insulating film formed simultaneously with the gate insulating layer 2 serves as a dielectric layer. Moreover, the semiconductor layer 1a includes the second extending portion 1f which extends to a region which overlaps the second capacitor line portion 3d. The second extending portion 1f and the second capacitor line portion 3d constitute the second storage capacitor 60b in which the insulating film formed simultaneously with the gate insulating layer 2 serves as a dielectric layer. Here, the second extending portion 1f is connected to the first extending portion 1e via the third extending portion 1g. The third extending portion 1g overlaps the third capacitor line portion 3e in a region where the third extending portion 1g overlaps the data line 5a, and constitutes the third storage capacitor 60c in which the insulating film formed simultaneously with the gate insulating layer 2 serves as a dielectric layer.

Advantage(s) of Second Embodiment

As described above, the capacitor line 3b includes the first capacitor line portion 3c, the second capacitor line portion 3d, and the third capacitor line portion 3e in the liquid crystal device 100 of the second embodiment, the liquid crystal device 100 being driven in the IPS mode. The first capacitor line portion 3c is at the position close to the corresponding one of the scanning lines 3a and extends in parallel with the scanning line 3a. The second capacitor line portion 3d is formed so as to overlap the bent portions 7i of the pixel electrode 7a and the bent portions 9i of the common electrode 9a. The third capacitor line portion 3e connects the first capacitor line portion 3c and the second capacitor line portion 3d. The first storage capacitor 60a, the second storage capacitor 60b, and the third storage capacitor 60c are formed by utilizing the first capacitor line portion 3c, the second capacitor line portion 3d, and the third capacitor line portion 3e of the capacitor line 3b, respectively, and these storage capacitors 60a, 60b, and 60c constitute the storage capacitor 60. Therefore, even in the case where the first capacitor line portion 3c, which extends in parallel with the scanning line 3a at a position close to the scanning line 3a, is not formed so as to have a large width, the storage capacitor 60 having a sufficient capacitance can be formed.

In addition, the second capacitor line portion 3d is formed so as to overlap the bent portions 7i of the pixel electrode 7a and the bent portions 9i of the common electrode 9a. Such an overlapping region may be referred to as a disclination line having irregular alignments of the liquid crystal. Therefore, since an amount of emitted display light does not decrease even when the second capacitor line portion 3d is added, and thereby a high quality image can be displayed.

In addition, the third capacitor line portion 3e is formed in the region which overlaps the data line 5a. Since such a region overlaps the light-blocking film 23 formed in the counter substrate 20, an amount of emitted display light does not decrease even when the third capacitor line portion 3e is added, and thereby a high quality image can be displayed.

Moreover, the first and the second capacitor line portions 3c and 3d extend along the corresponding scanning line 3a so as to pass between a plurality of pixels 100a, and are connected via the third capacitor line portion 3e. Thus, according to the second embodiment, there is an advantage that the capacitor line 3b has a lower wiring resistance than a structure in which the second capacitor line portion 3d merely branches from the first capacitor line portion 3c.

Furthermore, the third capacitor line portion 3e extends partially along the corresponding data line 5a and does not extend close to the target scanning line 3a. Therefore, since an overlapping area of the third capacitor line portion 3e and the data line 5a can be minimized, a parasitic capacitance between the capacitor line 3b and the data line 5a can be reduced.

OTHER EMBODIMENTS

A polysilicon film is used as the semiconductor layer, as an example, in the first and second embodiments; however, the invention may be applied to the element substrate 10 including an amorphous film. In addition, the invention may be applied to a liquid crystal device which includes a thin-film diode element (a non-linear element) serving as a pixel switching element.

Exemplary Electronic Apparatuses with Liquid Crystal Device

Figure 5A:
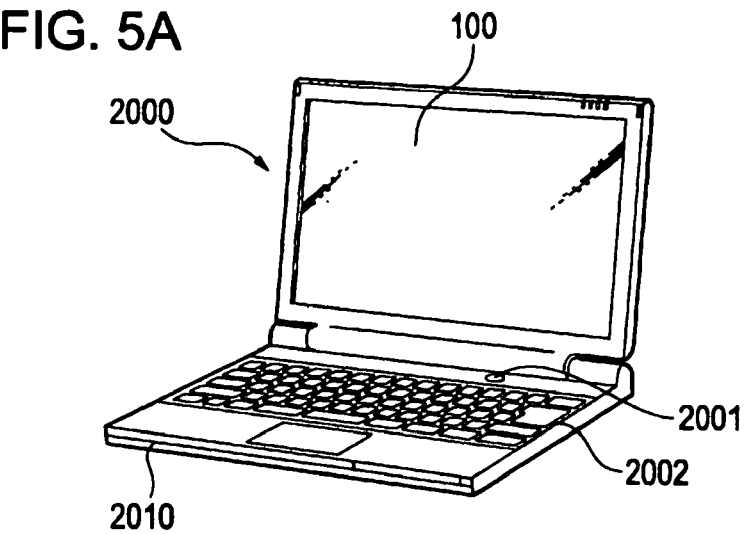
FIGS. 5A, 5B, and 5C are diagrams for explaining electronic devices in which the liquid crystal device according to the invention is used.
Figure 5B:
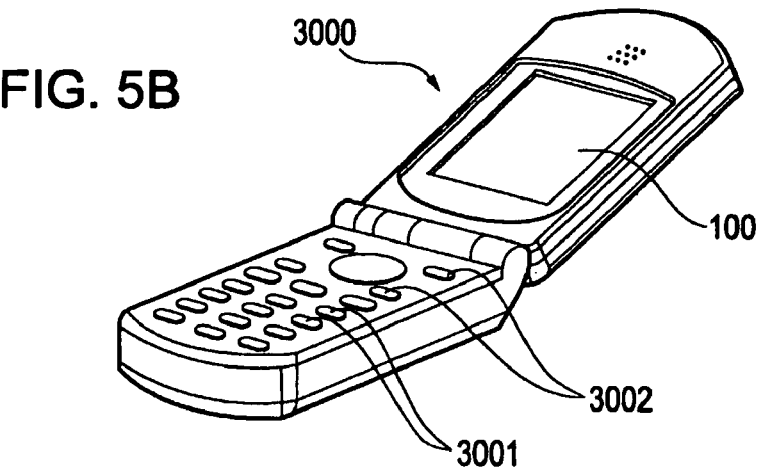
Figure 5C:
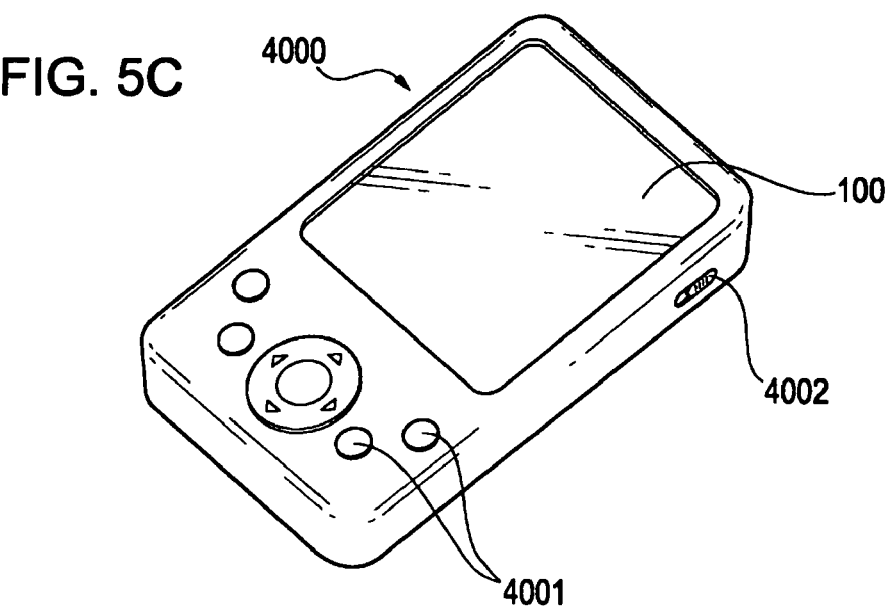

Next, electronic apparatuses using the liquid crystal device 100 according to any one of the above-described embodiments will be described. FIG. 5A shows a structure of a mobile personal computer including the above-described liquid crystal device 100. A personal computer 2000 includes the liquid crystal device 100 serving as a display unit and a main unit 2010. The main unit 2010 includes a power switch 2001 and a keyboard 2002. FIG. 5B shows a structure of a cellular telephone using the above-described liquid crystal device 100. A cellular telephone 3000 includes a plurality of operation buttons 3001, a scroll button 3002, and the liquid crystal device 100 serving as a display unit. Controlling the scroll button 3002 scrolls a screen displayed on the liquid crystal device 100. FIG. 5C shows a structure of a personal digital assistant (PDA) using the above-described liquid crystal device 100. A PDA 4000 includes a plurality of operation buttons 4001, a power switch 4002, and the liquid crystal device 100 serving as a display unit. When the power switch 4002 is operated, various information such as an electrical address book or a schedule book is displayed on the liquid crystal device 100.

The electronic apparatuses using the liquid crystal device 100 include, not only the devices shown in FIGS. 5A through 5C, but also other electronic apparatuses, such as digital still cameras, liquid crystal television, view-finder-type or monitor-direct-view-type video recorders, car navigation systems, pagers, electronic organizers, calculators, word processors, workstations, videophones, point-of-sale (POS) terminals, and devices provided with touch panels. The above-described liquid crystal device 100 can be used as the display units of those electronic apparatuses.

The entire disclosure of Japanese Patent Application No. 2007-043371, filed Feb. 23, 2007 is expressly incorporated by reference herein.

What is claimed is:

1. A liquid crystal device comprising:
an element substrate including a scanning line, a data line and a pixel electrode formed at an intersection thereof, the pixel electrode including a cutout;
a semiconductor layer, a portion of the semiconductor layer overlapping a first portion of the data line when viewed from above;
a counter substrate opposite the element substrate;
a liquid crystal held between the element substrate and the counter substrate; and
a capacitor line for providing a storage capacitor, the capacitor line including:
(a) a first capacitor line portion that extends along with the scanning line;
(b) a second capacitor line portion that overlaps the cutout of the pixel electrode; and
(c) a third capacitor line portion which overlaps a second portion of the data line when viewed from above, the third capacitor line portion and the semiconductor layer constituting a first storage capacitor.

2. The liquid crystal device of claim 1, wherein the first and the second capacitor line portions are formed as a wiring that passes through a plurality of pixels that extend along the capacitor line.

3. The liquid crystal device of claim 1, wherein the third capacitor line portion connects the first and second capacitor line portions to each other.

4. The liquid crystal device of claim 1, which includes a pixel switching element that is formed between the data line and the pixel electrode, the pixel switching element being ON state in a case where the scanning lines is selected, wherein:
(a) the pixel switching element is composed of a thin-film transistor which includes the semiconductor layer; and
(b) a second portion of the semiconductor layer of the thin-film transistor extends to a region which overlaps the first and second capacitor line portions and a second storage capacitor is formed between the semiconductor layer and the first and second capacitor line portions at the region.

5. A liquid crystal device comprising:
an element substrate including a scanning line, a data line and a pixel electrode formed at an intersection thereof, the pixel electrode being divided into a plurality of sub-pixel electrodes connected with a connecting portion therebetween;
a semiconductor layer, a portion of the semiconductor layer overlapping a first portion of the data line when viewed from above;
a counter substrate opposite the element substrate;
a liquid crystal held between the element substrate and the counter substrate, the liquid crystal has a negative anisotropy of dielectric constant; and
a capacitor line for providing a storage capacitor, the capacitor line including:
(a) a first capacitor line portion that extends along with the scanning lines;
(b) a second capacitor line portion overlapping a region provided between sub-pixel electrodes; and
(c) a third capacitor line portion which overlaps a second portion of the data line when viewed from above, the third capacitor line portion and the semiconductor layer constituting a first storage capacitor.

6. The liquid crystal device of claim 5, wherein the first and the second capacitor line portions are formed as a wiring that passes through a plurality of pixels that extend along the capacitor line.

7. The liquid crystal device of claim 5, wherein the third capacitor line portion connects the first and second capacitor line portions to each other.

8. The liquid crystal device of claim 5, which includes a pixel switching element formed between the data line and the pixel electrode, the pixel switching element being ON state in a case where the scanning lines is selected, wherein:

(a) the pixel switching element is composed of a thin-film transistor which includes the semiconductor layer; and (b) a second portion of the semiconductor layer of the thin-film transistor extends to a region which overlaps the first and second capacitor line portions and a second storage capacitor is formed between the semiconductor layer and the first and second capacitor line portions at the region.

9. The liquid crystal device of claim 1, wherein the portion of the semiconductor layer overlapping the first portion of the data line when viewed from above also overlaps a portion of the third capacitor line portion.

* * * * *